April 16, 1957 M. S. LIVINGSTON 2,789,158

TELEVISION CABINET WITH RETRACTABLE SPEAKER ON TOP WALL

Filed May 14, 1953

MILTON S. LIVINGSTON
INVENTOR.

BY Francis W. Crotty

HIS ATTORNEY.

2,789,158

TELEVISION CABINET WITH RETRACTABLE SPEAKER ON TOP WALL

Milton S. Livingston, Omaha, Nebr., assignor to Zenith Radio Corporation, a corporation of Illinois Application May 14, 1953, Serial No. 355,139

1 Claim. (Cl. 178—5.8)

This invention relates to television receivers and more particularly to the problem of sound directivity in a television receiver of the table model type.

It is, of course, preferable that the image and sound appear to originate at a common source within a television receiver and, wherever possible, this is achieved by locating the screen and speaker in the same panel of the instrument cabinet. However, this expedient cannot be conveniently adopted in table-model receivers because it requires a large cabinet which is incompatible with the styling and functional objectives of such receivers. It has been the practice, throughout the industry, to employ table-model receiver cabinets of the smallest practical physical dimensions with the screen area of picture tube exposed through a space in the forward wall and with the loudspeaker installed on a side wall. Such arrangements direct the sound generally perpendicular to the line of sight established between the picture tube and the viewer. This introduces an objectionable directional effect of sound in respect of picture and requires appreciably more power to obtain a desired effective volume.

Further, the problem of directing both audio and video to a common vantage point is aggravated by the general trend toward an increase in picture tube size which virtually eliminates all possibility of placing a loudspeaker in the forward wall of the cabinet.

It is an important object of this invention, therefore, to provide a table-model television receiver characterized by a novel loudspeaker arrangement which directs audio intelligence in a line parallel to the direction of video intelligence without locating the loudspeaker in the front area of its enclosing cabinet.

It is a further object of this invention to arrange the speaker assembly in such a manner, as to allow displacement from an inoperative position within the cabinet to a functional position in which the speaker projects from the confines of the cabinet into a particularly beneficial relation with respect to the picture screen.

In accordance with the invention, a cabinet for encasing a television receiver including a loudspeaker and a cathode-ray tube and having a front wall, dimensioned to be use substantially entirely occupied by the viewing screen of the cathode-ray tube, comprises a top wall having a generally semi-circular aperture, the straight boundary of which is substantially parallel to and nearest the front wall. A housing, of a shape approximating a quarter section of a sphere and of a size permitting disposition thereof complementarily and snugly within the aperture, is hinged to the top wall at the straight boundary of the aperture for pivotal movement through the aperture from a first position in which the housing is wholly confined within the cabinet to a second position at which the housing is projected substantially beyond the confines of the cabinet. A baffle plate is affixed to the housing and so disposed with respect thereto as to be substantially parallel to the front wall when the housing is in its second position, thereby permitting mounting of the loudspeaker on the baffle plate in a position to direct sound waves through the latter outwardly of the housing and toward the front wall when the housing is in the second position. Finally, there is provided a latch, including a spring-catch mounted on the housing and engaging the portion of the top wall bounding the side of the aperture remote from the front wall, for releasably maintaining the housing in its second position.

The features of the present invention which are believed to be novel, are set forth with particularity in the the appended claim. The invention, together with further objects and advantages thereof, may best be understood, by reference of the following description taken in connection with the accompanying drawing, in the several figures of which like reference numerals indicate like elements and in which:

Figures 1, 2, 3:
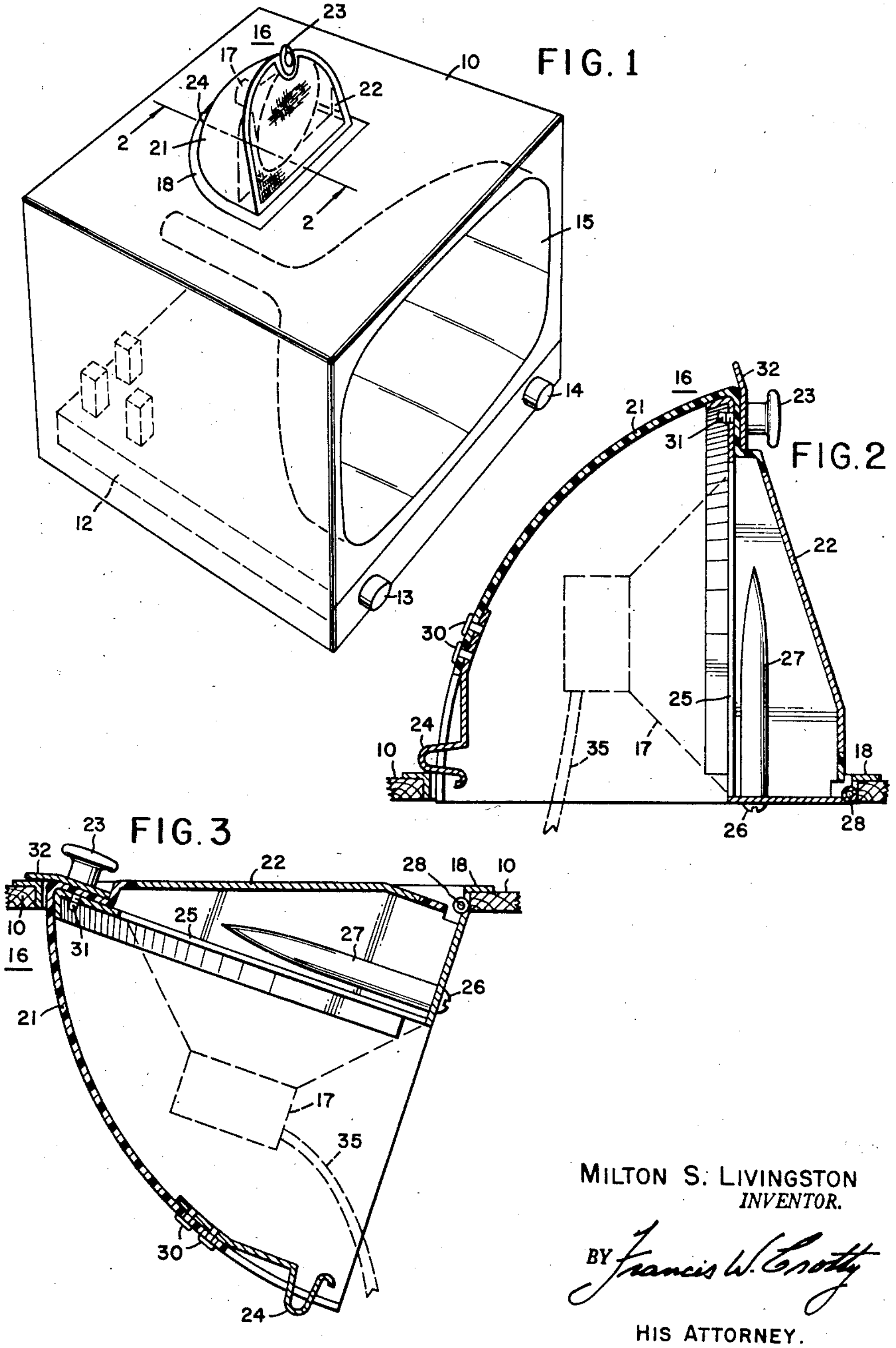
Figure 1 is a perspective view of a table model television reeciver assembly constructed in accordance with the present invention.
Figure 2 is a fragmentary cross-sectional view taken along line 2—2 of Figure 1 and drawn to a larger scale to show the loudspeaker and receiver in its extended or operating position.

While Figure 3 is a view of the same structure as Figure 2 but with the loudspeaker in its inoperative position.

Referring now more particularly to Figure 1, the table-model television receiver there represented comprises a cabinet 10 having a top and side wall portions one of which is provided with an aperture. More particularly, for the embodiment illustrated the top section of the cabinet has an aperture in its center portion to accommodate a speaker assembly. The receiver chassis 12 is represented in broken-line construction; it includes the customary receiving circuits for translating audio and video wave signals, and further includes an image-reproducing device, usually a cathode-ray tube, coupled to such circuits and having an exposed viewing screen 15 which occupies substantially the entire front area of the cabinet. The manual controls 13 and 14, which facilitate adjustment of selectivity, brightness, etc., are also installed on the front panel of the cabinet.

With the viewing screen occupying the front panel of the instrument it is most desirable, in order to produce the sensation of the sound and picture originating from a common source, to have the speaker face in the same direction as the image screen. To that end, a table-model television receiver, in accordance with the present invention, features an improved and unusual installation of the speaker assembly in respect of the cabinet. The speaker assembly 16 is pivotally affixed to the top wall of the cabinet in juxtaposition to the aperture thereof to be movable from a first position, in which the assembly is wholly confined within the cabinet, to a second position, in which it projects at least partially beyond the confines of the cabinet to direct audio radiations substantially parallel to viewing screen 15. More particularly, a bracket 18, to which the housing of the speaker assembly is pivotally secured, is fastened in the top section of the cabinet in circumscribing relation to the aperture. The housing is represented in Figure 2 and its pivoted connection to bracket 18 is designated 28.

The housing of speaker assembly 16 comprises a substantially semi-paraboloidal shell 21 and a decorative front panel 22 and is constructed of a material, such as plastic, capable of being formed or shaped into the desired configuration. A conventional loudspeaker 17 is supported within the housing by a baffle plate 25, secured to an inwardly extending projection or rib 27 of the housing by a bolt 26 or other suitable fastening means. Baffle plate 25 has a generally L-shaped configuration one arm of which is mechanically connected to the core of the speaker 17 while the other arm provides the pivotal connection of the speaker assembly to bracket 18. Additional mounting screws 31 may be provided at the opposite end of the baffle plate more completely to secure the plate to the speaker housing and speaker 17 is electrically coupled to the receiving circuits of chassis 12 by a conductor pair 35.

A spring latch 24 attached to the inner surface of shell 21 by fastening means 30 constitutes means for releasably supporting the speaker assembly in the position illustrated in Figure 2 and for permitting this assembly to be retracted into its alternate position represented in Figure 3. The latch is shaped to conform either to the bracket 18 or to the cabinet section such that it may releasably hold speaker assembly 16 in the extended position shown in Figure 2. The assembly 16 also includes a knob or handle 23 for displacing the assembly, as between its alternative positions and a stop 32 mechanically held in position by means of the knob 23 and projecting beyond shell 21 to engage the top surface of the cabinet to limit the travel of the assembly as it is retracted within the confines of the cabinet.

When the receiver is not being used, speaker assembly 16 rests in the position shown in Figure 3 with its front panel 22 substantially parallel to the top surface of the cabinet. When the receiver is to be operated, the speaker assembly may remain in the position illustrated, although it is preferred and contemplated that the speaker be displaced into the operating position of Figure 2 wherein the assembly projects beyond the confines of the cabinet. With the speaker assembly in this operating position, both the audio and video intelligence are directed along parallel paths to a common vantage point which represents the optimum conditions of reception from the standpoint of the viewer. Spring latch 24 engages bracket 18 to releasably maintain the assembly in this operating position; when the set is turned off, this spring may be depressed and released, permitting the speaker assembly to pivot about point 28 and recede into the cabinet until stop 32 engages the top section and arrests the return movement with the speaker assembly in the position depicted in Figure 3. The described arrangement offers the distinct advantage that a viewer perceives the audio and video intelligence as originating at a common source within the cabinet. This result is accomplished without undesirably increasing the size of the cabinet normally employed for table instruments and offers the further advantage of allowing the use of large speakers which is most desirable from the standpoint of the fidelity of the audio system. While the arrangement has been illustrated with the speaker assembly installed in the top section of the cabinet, if desired, this assembly may be mounted in a side panel. It is only necessary in this case to so position the assembly to direct the sound along the viewing path of the observer.

While a particular embodiment of the invention has been shown and described, modifications may be made and it is intended in the appended claim to cover all such modifications as may fall within the true spirit and scope of the invention.

I claim:

A cabinet for encasing a television receiver including a loudspeaker and having a front wall, dimensioned to be in use susbtantially entirely occupied by the viewing screen of a cathode-ray tube, comprising: a top wall having a generally semi-circular aperture, the straight boundary thereof being substantially parallel to and nearest said front wall; a housing, of a shape approximating a quarter section of a sphere and of a size permitting disposition thereof complementarily and snugly within said aperture, hinged to said top wall at said straight boundary for pivotal movement through said aperture from a first position in which said housing is wholly confined within said cabinet to a second position in which the housing is projected substantially beyond the confines of said cabinet; a baffle plate affixed to said housing and so disposed with respect thereto as to be substantially parallel to said front wall when said housing is in said second position; means for mounting a loudspeaker on said baffle plate in a position to direct sound waves through the baffle plate outwardly of the housing and toward said front wall when the housing is in said second position; and latch means, including a spring-catch mounted on said housing and engageable with the portion of said top wall bounding the side of said aperture remote from said front wall, for releasably maintaining said housing in said second position.

References Cited in the file of this patent

UNITED STATES PATENTS

| | | |
|---|---|---|
| 1,562,257 | Stevenson | Dec. 13, 1927 |
| 2,109,431 | McDonald | Feb. 22, 1938 |
| 2,446,214 | Cramer | Aug. 3, 1948 |

OTHER REFERENCES

Rider's Television Manual, vol. 2, GE TV, page 2-1.